US009723123B2

(12) United States Patent
Yuan et al.

(10) Patent No.: US 9,723,123 B2
(45) Date of Patent: Aug. 1, 2017

(54) MULTI-SCREEN CONTROL METHOD AND DEVICE SUPPORTING MULTIPLE WINDOW APPLICATIONS

(71) Applicant: SAMSUNG ELECTRONICS CO., LTD., Suwon-si (KR)

(72) Inventors: Jianguo Yuan, Nanjing (CN); Ming Liu, Nanjing (CN); Quan Ma, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 14/851,564

(22) Filed: Sep. 11, 2015

(65) Prior Publication Data
US 2016/0080549 A1 Mar. 17, 2016

(30) Foreign Application Priority Data

Sep. 12, 2014 (CN) .......................... 2014 1 0465581
Jul. 14, 2015 (KR) ........................ 10-2015-0099838

(51) Int. Cl.
H04M 1/72 (2006.01)
H04N 21/41 (2011.01)
(Continued)

(52) U.S. Cl.
CPC .... *H04M 1/72533* (2013.01); *H04N 21/4126* (2013.01); *H04N 21/4222* (2013.01);
(Continued)

(58) Field of Classification Search
CPC .......... G06F 3/048; G06F 3/14; G06F 3/1454; G06F 1/1694; G06F 3/038;
(Continued)

(56) References Cited

U.S. PATENT DOCUMENTS 6,493,038 B1    12/2002  Singh et al.
8,269,719 B1 *   9/2012  Kim .................... G06F 3/04895
                                                      345/156
(Continued)

FOREIGN PATENT DOCUMENTS

CN        1404685 A       3/2003
CN      103248952 A       8/2013
(Continued)

OTHER PUBLICATIONS

Communication dated Jan. 28, 2016 issued by European Patent Office in counterpart European Patent Application No. 15184625.0.
(Continued)

*Primary Examiner* — Khawar Iqbal
(74) *Attorney, Agent, or Firm* — Sughrue Mion, PLLC

(57) ABSTRACT

A method of controlling an application of a smart device, by the smart device, is provided. The method includes generating a composition window by compositing windows of applications of the smart device, and transmitting the composition window to a smart terminal on which the composition window is displayed. The method further includes receiving, from the smart terminal, information of a user input in the smart terminal with respect to the displayed composition window, and controlling and displaying at least one among the applications based on the received information of the user input.

18 Claims, 15 Drawing Sheets

(51) Int. Cl.

| | | |
|---|---|---|
| *G06F 3/048* | (2013.01) | |
| *H04M 1/725* | (2006.01) | |
| *H04N 21/422* | (2011.01) | |
| *H04N 21/436* | (2011.01) | |
| *H04N 21/4402* | (2011.01) | |
| *H04N 21/482* | (2011.01) | |
| *H04N 21/431* | (2011.01) | |
| *H04N 21/442* | (2011.01) | |

(52) U.S. Cl.
CPC . *H04N 21/42209* (2013.01); *H04N 21/42224* (2013.01); *H04N 21/4314* (2013.01); *H04N 21/43615* (2013.01); *H04N 21/440263* (2013.01); *H04N 21/482* (2013.01); *H04N 21/4312* (2013.01); *H04N 21/44222* (2013.01)

(58) Field of Classification Search
CPC ............ G06F 3/04817; G06F 3/04842; H04M 1/72533; H04N 21/4126; H04N 21/42209; H04N 21/4222; H04N 21/42224; H04N 21/4314; H04N 21/43615; H04N 21/440263; H04N 21/482; H04N 5/4403; H04N 3/04842; H04N 21/41407; H04N 21/4312; H04N 5/2624; H04N 21/42204; H04N 21/4122; G09G 5/14
USPC ................................ 455/420, 41.1, 566, 500
See application file for complete search history.

(56) References Cited

U.S. PATENT DOCUMENTS

| | | | | |
|---|---|---|---|---|
| 8,965,314 | B2* | 2/2015 | Jeong | H04N 21/4126 455/151.1 |
| 9,411,512 | B2* | 8/2016 | Song | G06F 3/04886 |
| 2005/0110909 | A1 | 5/2005 | Staunton et al. | |
| 2007/0030263 | A1 | 2/2007 | Lee et al. | |
| 2008/0077965 | A1 | 3/2008 | Kamimaki et al. | |
| 2011/0275391 | A1* | 11/2011 | Lee | H04M 1/7253 455/500 |
| 2012/0038679 | A1* | 2/2012 | Yun | G06F 3/1454 345/667 |
| 2012/0070085 | A1* | 3/2012 | Arn | H04N 7/185 382/173 |
| 2012/0260198 | A1* | 10/2012 | Choi | G06F 3/048 715/761 |
| 2013/0176205 | A1 | 7/2013 | Yamashita | |
| 2013/0227014 | A1 | 8/2013 | Song | |
| 2014/0002389 | A1* | 1/2014 | Kim | G06F 3/1446 345/173 |
| 2014/0009394 | A1* | 1/2014 | Lee | H04N 5/4403 345/157 |
| 2014/0071145 | A1 | 3/2014 | Lee et al. | |
| 2014/0240216 | A1* | 8/2014 | Bukurak | G06F 9/4856 345/156 |
| 2014/0340336 | A1* | 11/2014 | Jung | G06F 3/0488 345/173 |
| 2015/0065100 | A1* | 3/2015 | Arn | H04N 7/185 455/414.1 |
| 2016/0154561 | A1* | 6/2016 | Kato | G01C 21/3664 345/173 |
| 2016/0182945 | A1* | 6/2016 | Kim | H04N 21/43615 725/32 |
| 2016/0216852 | A1* | 7/2016 | Lee | G06F 3/04817 |

FOREIGN PATENT DOCUMENTS

| | | |
|---|---|---|
| CN | 103561220 A | 2/2014 |
| CN | 103607779 A | 2/2014 |
| CN | 103686199 A | 3/2014 |
| KR | 1020070012004 A | 1/2007 |
| KR | 1020120030644 A | 3/2012 |
| KR | 101340780 B1 | 12/2013 |

OTHER PUBLICATIONS

Communication dated Apr. 6, 2016 issued by European Patent Office in counterpart European Patent Application No. 15 184 625.0.

* cited by examiner

FIG. 8
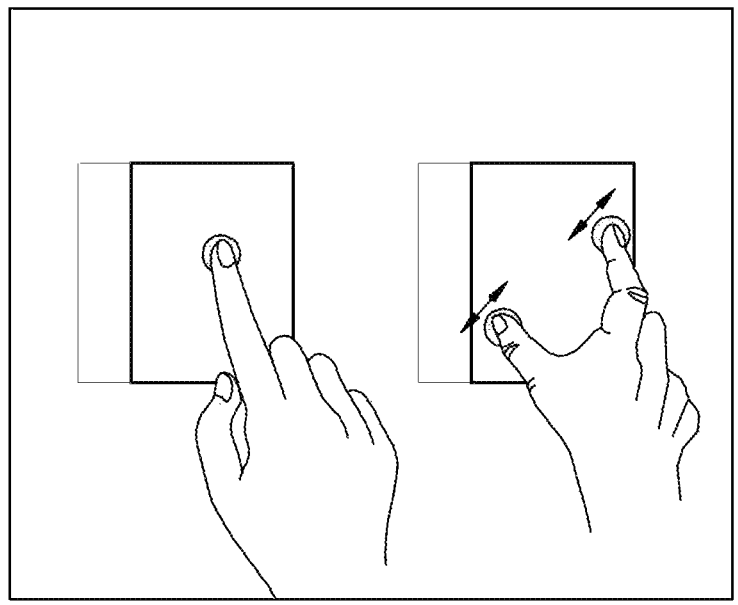
(a)
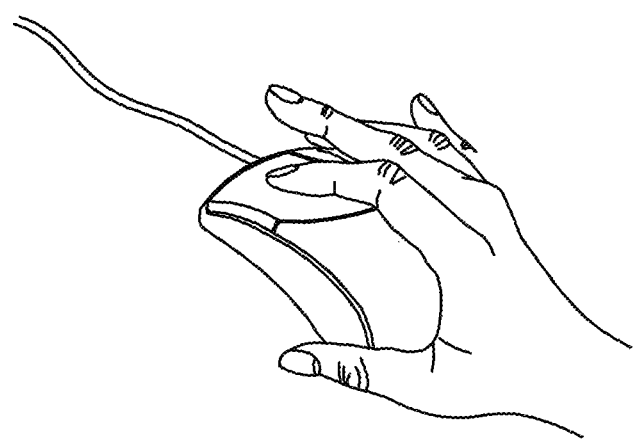
(b)

MULTI-SCREEN CONTROL METHOD AND DEVICE SUPPORTING MULTIPLE WINDOW APPLICATIONS

CROSS-REFERENCE TO RELATED APPLICATIONS

This application claims priority from Chinese Patent Application No. 201410465581.6, filed on Sep. 12, 2014, in the State Intellectual Property Office of the People's Republic of China, and Korean Patent Application No. 10-2015-0099838, filed on Jul. 14, 2015, in the Korean Intellectual Property Office, the disclosures of which are incorporated herein in their entireties by reference.

BACKGROUND

1. Field

Methods and apparatus consistent with exemplary embodiments relate to a multi-screen control method and a device supporting multiple window applications.

2. Description of the Related Art

The development of smart mobile phones is very rapid, and interest in interactions between smart mobile phones and televisions has increased. Videos and pictures stored in a mobile phone of a user may be displayed on a large screen of a television, to be viewed by the user and shared by the user with other users. Technologies of the related art include Digital Living Network Alliance (DLNA), AirPlay of Apple Inc. and Miracast specified by the WiFi Alliance. Both AirPlay of Apple Inc. and Miracast specified by the WiFi Alliance not only can cast general multimedia content onto the screen of a television through WiFi, but also can realize an exact mirroring function. That is, any interface displayed on the screen of a mobile phone can be wholly cast onto the screen of the television, thereby providing rich and interesting usage experiences. For example, when a user plays a game, the mobile phone may be used as a handle, and the television may be used as a display screen. Interconnection and display from a mobile phone side to a television side become innovation hotspots. For example, Millet box, Chromecast of Google Inc. and Dongle of Samsung Inc. may all implement mirror casting from the mobile phone side to the television side. The development of smart televisions has begun to speed up, and more and more manufacturers pay attention to the development of smart televisions. For example, Millet television and Letv have both introduced competitive smart televisions. Besides playing TV programs of the related art, smart televisions may almost do anything that can be done by the smart mobile phone. The functions of the smart television have become strong and complex, but remote control of the smart television becomes a bottleneck with respect to the smart television.

At present, there are some solutions for implementing interconnection between the mobile phone and the smart television. These solutions depend on a WiFi network, and synchronize and control the smart television through the mobile phone. However, these solutions all need development of various control applications on the mobile phone to implement remote control, and synchronization display of content is based on a whole display screen.

SUMMARY

Exemplary embodiments address at least the above problems and/or disadvantages and other disadvantages not described above. Also, one or more exemplary embodiments are not required to overcome the disadvantages described above, and an exemplary embodiment may not overcome any of the problems described above.

Aspects of one or more exemplary embodiments provide a multi-screen control method and a device supporting multiple window applications.

According to an aspect of an exemplary embodiment, there is provided a method of controlling an application of a smart device, by the smart device, the method including generating a composition window by compositing windows of applications of the smart device, transmitting the composition window to a smart terminal on which the composition window is displayed, receiving, from the smart terminal, information of a user input in the smart terminal with respect to the displayed composition window, and controlling and displaying at least one among the applications based on the received information of the user input.

The method may further include receiving, from the smart terminal, attribute information of a display of the smart terminal, and the generating may include adjusting an interface in which the composition window is to be displayed, based on the received attribute information.

The method may further include selecting the smart terminal from smart terminals.

The selecting may include selecting the smart terminal based on at least one among information of a user selection input selecting the smart terminal, use history information of the smart terminal previously used for displaying the composition window, and information for displaying the composition window.

The controlling may include determining the at least one among the applications based on attribute information of a display of the smart device and attribute information of the smart terminal.

The method may further include determining whether the composition window is to be displayed on the smart device, and the transmitting may include transmitting the composition window to the smart terminal in response to the determining that the composition window is not to be displayed on the smart device.

A non-transitory computer-readable storage medium may store a program including instructions for causing a computer to perform the method.

According to an aspect of an exemplary embodiment, there is provided a method of controlling an application of a smart device, by a smart terminal, the method including receiving, from the smart device, a composition window in which windows of applications of the smart device are composited, displaying, by a display of the smart terminal, the received composition window, receiving a user input with respect to the displayed composition window, and transmitting information of the user input to the smart device.

The method may further include adjusting a resolution of the composition window based on attribute information of the display, and the displaying may include displaying the adjusted composition window.

The method may further include adjusting the information of the user input, based on the adjusted resolution.

According to an aspect of an exemplary embodiment, there is provided a smart device configured to control an application of the smart device, the smart device including a processor configured to generate a composition window by compositing windows of applications of the smart device, and a communicator configured to transmit the composition window to a smart terminal on which the composition window is displayed, and receive, from the smart terminal, information of a user input in the smart terminal with respect to the displayed composition window. The processor may be further configured to control and display at least one among the applications based on the received information of the user input.

The communicator may be further configured to receive attribute information of a display of the smart terminal, and the processor may be configured to generate the composition window by adjusting an interface in which the composition window is to be displayed, based on the received attribute information.

The processor may be further configured to select the smart terminal from smart terminals.

The processor may be configured to select the smart terminal based on at least one among information of a user selection input selecting the smart terminal, use history information of the smart terminal previously used for displaying the composition window, and information for displaying the composition window.

The processor may be configured to determine the at least one among the applications based on attribute information of a display of the smart device and attribute information of the smart terminal.

The processor may be further configured to determine whether the composition window is to be displayed on the smart device, and the transmitter may be configured to transmit the composition window to the smart terminal in response to the processor determining that the composition window is not to be displayed on the smart device.

According to an aspect of an exemplary embodiment, there is provided a smart terminal configured to control an application of a smart device, the smart terminal including a communicator configured to receive, from the smart device, a composition window in which windows of applications of the smart device are composited, a display configured to display the received composition window, and a user input interface configured to receive a user input with respect to the displayed composition window. The communicator may be further configured to transmit information of the user input to the smart device.

The smart terminal may further include a processor configured to adjust a resolution of the composition window based on attribute information of the display, and the display may be configured to display the adjusted composition window.

The processor may be further configured to adjust the information of the user input, based on the adjusted resolution.

BRIEF DESCRIPTION OF THE DRAWINGS

The above and/or other aspects will be more apparent by describing exemplary embodiments with reference to the accompanying drawings, in which:

FIG. 8 is a view of a user input interface of a smart terminal receiving a user operation input, according to an exemplary embodiment;

DETAILED DESCRIPTION OF THE EXEMPLARY EMBODIMENTS

Figure 1:
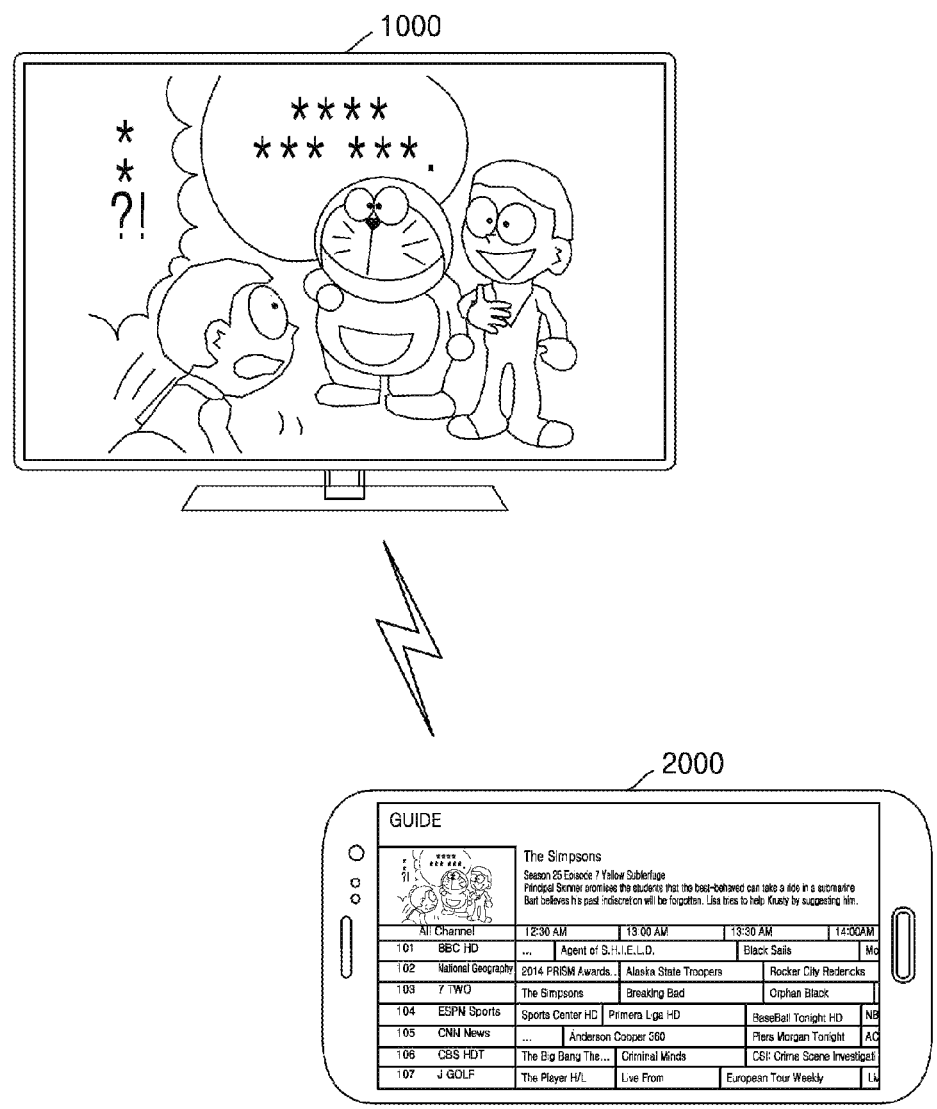
FIG. 1 is a view illustrating a user controlling a smart television, according to an exemplary embodiment.

Exemplary embodiments are described in greater detail with reference to the accompanying drawings.

Exemplary embodiments of the present disclosure may be diversely modified. Accordingly, exemplary embodiments are illustrated in the drawings and are described in detail in the detailed description. However, it is to be understood that the present disclosure is not limited to an exemplary embodiment, but includes all modifications, equivalents, and substitutions without departing from the scope and spirit of the present disclosure. Also, well-known functions or constructions may not be described in detail because they would obscure the disclosure with unnecessary detail.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters.

FIG. 1 is a view illustrating a user controlling a smart television 1000, according to an exemplary embodiment. Referring to FIG. 1, the smart television 1000 displays an image on a large screen thereof, and a smart terminal 2000 is used to display and control functions of the smart television 1000.

In this specification, aspects described with respect to the smart television 1000 may also apply to other smart devices including smart phones.

By using the smart television 1000, the user may play television programs, perform movie streaming and websurfing, and execute various applications. For example, the user may select other programs by executing an electronic program guide (EPG) application while watching a television program by using the smart television 1000.

The smart television 1000 may execute a number of applications at the same time. However, in the case of a smart television providing a single window display, it is hard to execute a multi-window display, and when executing a number of applications at the same time, overlap display may be applied. When the overlap display is provided, a user is only able to see an application window located at an uppermost portion of the screen, among a plurality of application windows, and is not able to see two or more application windows at the same time. Thus, if the user executes an EPG while watching a television program, the user may first have to close the television program screen that is presently played. Previous methods of simultaneously executing an EPG and displaying a presently played program include a method of displaying an EPG interface by using an on-screen display. That is, the EPG interface is displayed on a present interface, as a window-type, rather than being displayed on the whole screen, to be selectable by a user. If a size of the EPG interface is large, the EPG interface may cover the presently played image. If a size of the EPG interface is small, an amount of information that is displayed may be restricted.

Thus, a user may control the smart television 1000 or a display operation of the smart television 1000, by using the smart terminal 2000. For example, the smart terminal 2000 may display an application window executed in the smart television 1000, or all or part of an image displayed on a screen of the smart television 1000. Also, the user may control the smart television 1000 by using a touch screen input of the smart terminal 2000. The smart terminal 2000 may be a smart phone or a tablet personal computer (PC), but is not limited thereto.

Figure 2:
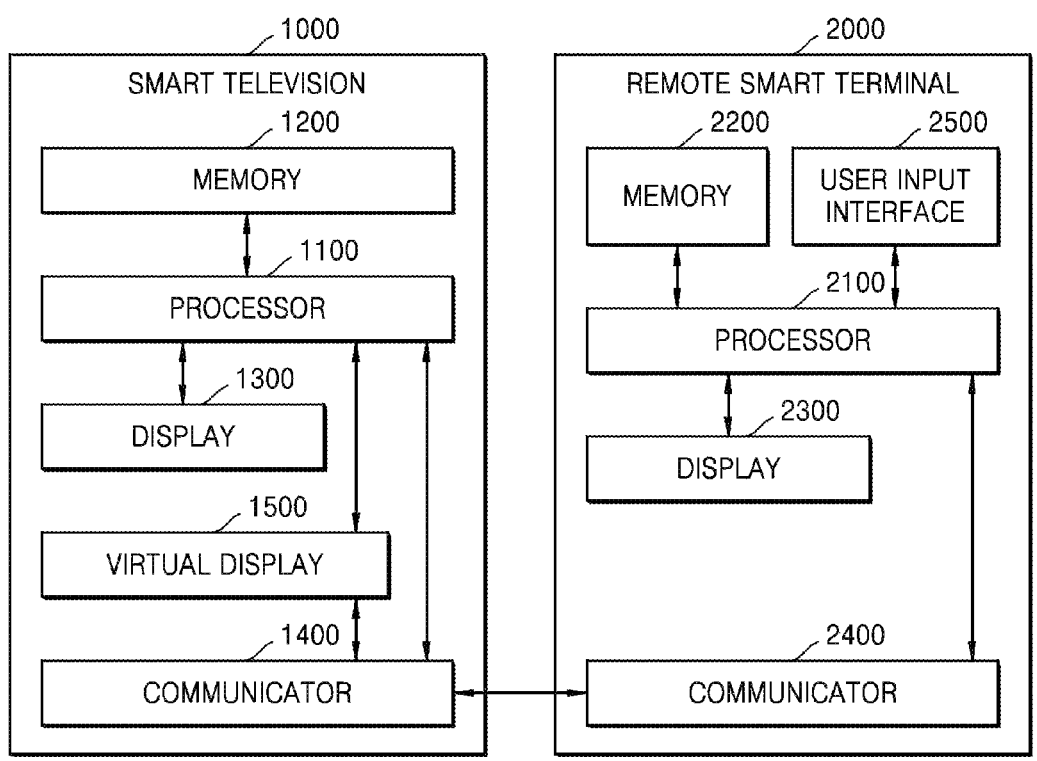
FIG. 2 is a block diagram of a smart television and a remote smart terminal, according to an exemplary embodiment.

FIG. 2 is a block diagram of the smart television 1000 and the remote smart terminal 2000, according to an exemplary embodiment. Referring to FIG. 2, the smart television 1000 includes a processor 1100, a memory 1200, a display 1300, and a communicator 1400. Also, the smart terminal 2000 includes a processor 2100, a memory 2200, a display 2300, a communicator 2400, and a user input interface 2500.

The processor 1100 of the smart television 1000 controls the memory 1200, the display 1300, and the communicator 1400 of the smart television 1000. The processor 1100 may execute an application and control the display 1300 to display a result of the execution of the application. The result of the execution of the application may be displayed on a screen of the smart television 1000 or on a screen of the smart terminal 2000. To determine a location on which the result of the execution of the application is to be displayed, the processor 1100 may first obtain information with respect to the display location. When the display location is determined as the smart terminal 2000, the processor 1100 may composite application windows, and may transmit a result of the composition to the smart terminal 2000 by using the communicator 1400. The composition result of the application windows may be a composition window that may be displayed on the smart terminal 2000.

The smart terminal 2000 may receive information relating to a user input, by using the user input interface 2500, while an application is being executed. The user input may include an operation performed by the user with respect to the smart terminal 2000. The smart terminal 2000 may analyze the received information relating to the user input. The information relating to the user input may include user operation information including operation location information and operation type information with respect to an operation performed by the user. The operation location information and the operation type information may include information about a coordinate on a touch screen of the smart terminal 2000 including the user input interface 2500. The smart terminal 2000 may read the operation location information and the operation type information included in the information relating to the user input, and may transmit the operation location information and the operation type information to the smart television 1000 by using the communicator 2400 of the smart terminal 2000.

The smart television 1000 may determine the application executed in the smart terminal 2000 and the user operation, by analyzing the received operation type information and the received operation location information, and may determine a response with respect to the user operation. The response with respect to the user operation may include controlling an application corresponding to the user operation.

The smart television 1000 further includes a virtual display 1500, which is configured to manage the composition result of the application windows, which is to be displayed on the smart terminal 2000. In this case, the processor 1100 may transmit the composition result of the application windows, which is to be displayed on the smart terminal 2000, to the virtual display 1500. The virtual display 1500 may manage the composition result of the application windows, which is to be displayed on the smart terminal 2000. Also, the virtual display 1500 may transmit the composition result of the application windows, which is to be displayed on the smart terminal 2000, to the smart terminal 2000, by using the communicator 1400.

The processor 2100 of the smart terminal 2000 controls the memory 2200, the display 2300, the communicator 2400, and the user input interface 2500 of the smart terminal 2000.

The processor 2100 may control the display 2300 to display the composition result of the application windows, which is received by the communicator 2400. According to the content displayed on the smart terminal 2000, the user may perform an operation by using the user input interface 2500. The processor 2100 may transmit the user operation information received by the user input interface 2500 to the smart television 1000 by using the communicator 2400. The user input interface 2500 may include a touch screen, a keyboard, a house, or a button, but it is not limited thereto.

The response with respect to the user operation, which is determined by the smart television 1000 by analyzing the user operation information transmitted by the smart terminal 2000, may be reflected in the smart television 1000 or the smart terminal 2000. However, it is not limited thereto. For example, the response with respect to the user operation may be reflected in a third smart terminal.

Figure 3:
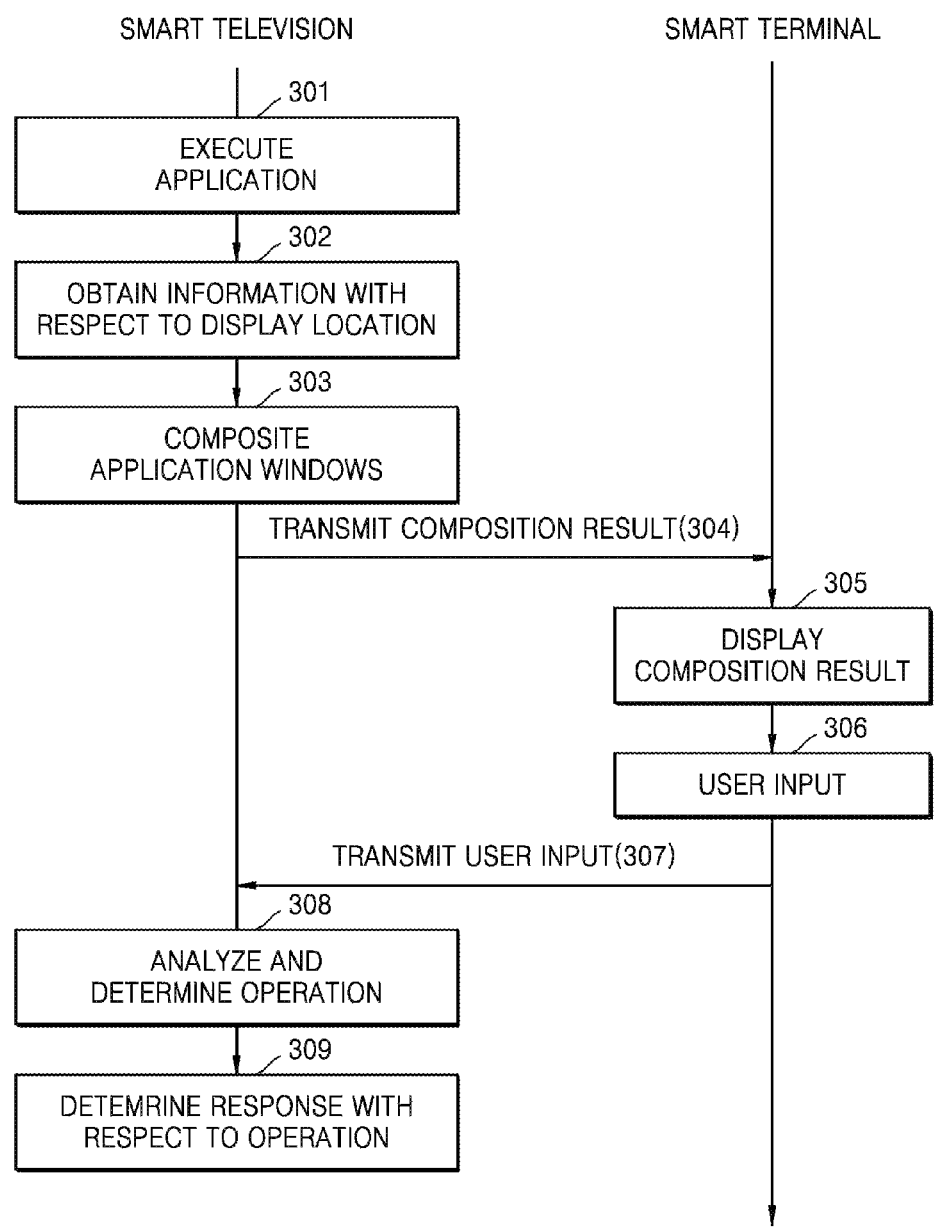
FIG. 3 is a flowchart of a method in which a smart television and a smart terminal interact with each other, according to an exemplary embodiment.

FIG. 3 is a flowchart of a method in which the smart television 1000 and the smart terminal 2000 interact with each other, according to an exemplary embodiment. In operation 301, the smart television 1000 executes an application of the smart television 1000. In operation 302, the smart television 1000 instantly obtains information with respect to a display location of the application.

The display location may be the smart television 1000 or one of a plurality of smart terminals 2000 connected to the smart television 1000. The smart television 1000 and the smart terminals 2000 may be connected with each other via WiFi or Bluetooth, but it is not limited thereto. Methods of searching and connecting devices are the same as previous methods, and thus, their detailed descriptions will be omitted.

The process in which the smart television 1000 obtains the information with respect to the display location of the application may be as follows. After the smart television 1000 receives an input for executing the application, the smart television 1000 may urge the user to input the display location. The smart television 1000 may display a list of all possible display locations on the smart television 1000 or the smart terminal 2000. The display locations on the list may include the smart television 1000 and all smart terminals 2000 connected to the smart television 1000. The smart television 1000 may receive information of the display location from the user and record the display location of the application in the memory 1200 of the smart television 1000. When the application is executed again the next time, the smart television 1000 may instantly determine the display location of the application by using the data stored in the memory 1200. In this case, the display location of the application may be the location that was selected by the user when the application was executed before. According to this method, the user may not have to newly select the display location of the application every time. Alternatively, a basic display location of an application may be stored in the memory 1200. For example, the smart terminal 2000 may be set as the basic display location of an application. In this case, except the case in which the smart television 1000 is not connected to any smart terminal, the smart television 1000 may select the smart terminal 2000 as the display location when executing the application.

In operation 303, the smart television 1000 composites application windows to be displayed. The smart television 1000 may composite the application windows that have the same display location. If the applications are displayed on the smart terminal 2000, the smart television 1000 may transmit a result of the composition to the smart terminal 2000. If the applications are displayed on the smart television 1000, the smart television 1000 may display the composition result on the screen of the smart television 1000.

The smart television 1000 may receive content of each application window and prepare to display the received content. The smart television 1000 may first determine display locations of application windows and composite application windows having the same display location. Methods of compositing the application windows are the same as previous methods, and thus, their detailed description will be omitted herein.

After the application windows which are to be displayed on the smart television 1000 are composited, the smart television 1000 may display a result of the composition on the screen of the smart television 1000. Then, the user may see the application window on the screen of the smart television 1000. With respect to content of the application displayed on the smart terminal 2000, the smart television 1000 may transmit the composition result to the smart terminal 2000, and the smart terminal 2000 may display the composition result. Here, a plurality of smart terminals 2000 may be connected to the smart television 1000. With respect to applications displayed on different smart terminals 2000, the smart television 1000 may composite the application windows corresponding to each of remote mobile terminals 200, and then, may transmit a result of the composition to each remote mobile terminal 200. According to this method, the user may see the application content on the screen of the smart terminal 2000. In this way, the user may simultaneously see the different application content by using the different display devices. For example, the user may watch a television program on the screen of the smart television 1000, and at the same time, may watch an EPG.

Also, before transmitting the composition result to the smart terminal 2000, the smart television 1000 may encode and compress the composition result. The smart television 1000 may receive display attribute information of the smart terminal 2000. The display attribute information of the smart terminal 2000 may include a resolution of the smart terminal 2000. If the smart terminal 2000 and the smart television 1000 have different resolutions, the smart television 1000 may adjust an interface of the application based on the resolution of the smart terminal 2000, before compositing the content of each window. For example, when the resolution of the smart terminal 2000 is less than that of the smart television 1000, the smart television 1000 may simplify the interface of the application to be displayed on the smart terminal 2000 to increase the visibility and convenience. For example, the smart television 1000 may adjust the interface by adjusting an amount of information displayed on a page of the application or the number of buttons. In this way, it may be easy for the smart terminal 2000 to display the interface of the application.

In operation 304, the smart television 1000 transmits the composition result of the application windows to the smart terminal 2000. The communication between the smart television 1000 and the smart terminal 2000 may be performed by using WiFi, Bluetooth, etc., but it is not limited thereto. When the smart television 1000 transmits data, a transmission rate thereof may be set according to an actual condition. In the case of a WiFi connection, the smart television 1000 may transmit the composition result at 30 frames per second, but it is not limited thereto.

In operation 305, the smart terminal 2000 displays the composition result of the applications that is received from the smart television 1000. If the composition result of the applications that is received from the smart television 1000 is encoded or compressed, the smart terminal 2000 may first decode or decompress the received content and then may display the content on the screen. In preparation for the case where the resolutions of the smart terminal 2000 and the smart television 1000 are different from each other, the smart terminal 2000 may receive resolution information of the smart television 1000 after receiving the composition result of the application windows, and may perform resolution adjustment with respect to the received composition result, thereby obtaining an optimal display result.

In operation 306, the smart terminal 2000 receives an operation input from the user. The smart terminal 2000 may receive the operation performed by the user on the screen of the smart terminal 2000, read the operation location and type, and transmit the operation location and type to the smart television 1000 without analyzing the operation location and type. For example, when an EPG is displayed on the screen of the smart terminal 2000 and the user performs an operation of touching a channel displayed on the EPG, the smart terminal 2000 may transmit the touch operation and the location of the touch operation to the smart television 1000 without analyzing the touch operation to obtain the information that "the user selects a channel." The operation type may include a touch operation, a click operation, and an enlargement or reduction of the screen.

If the resolution adjustment is performed in operation 305, the operation location information may have to be converted into operation location information corresponding to the resolution before the operation location information is adjusted. The operation location information may be coordinate information. In this case, the coordinate may have to be converted in correspondence to the resolution of the composition result transmitted by the smart television 1000.

In operation 307, the smart terminal 2000 transmits the operation input from the user to the smart television 1000. For example, the smart terminal 2000 may transmit the operation type information and the operation location information to the smart television 1000. The communication between the smart television 1000 and the smart terminal 2000 may be performed by using WiFi, Bluetooth, etc., but it is not limited thereto. When the smart television 1000 transmits data, a transmission rate thereof may be set according to an actual condition. In a WiFi connection, the smart television 1000 may transmit the composition result at 30 frames per second, but it is not limited thereto.

In operation 308, the smart television 1000 analyzes the operation information received, and determines the operation. By compositing a result of the analysis and the application window information transmitted to the smart terminal 2000, the smart television 1000 may determine an application operated by the user, and may transmit the operation type information and the operation location information to the application so that the application may process the operation type information and the operation location information. The processor 1100 of the smart television 1000 may determine the user operation by compositing the application information and the user operation information.

For example, when the user touches the button of a program of the EPG displayed on the screen of the smart terminal 2000, the smart terminal 2000 may transmit the touch operation information to the smart television 1000. The smart television 1000 may determine what the user has operated in the EPG, according to the operation location information. For example, the smart television 1000 may know which program the user has selected.

In operation 309, the smart television 1000 determines a response with respect to the determined operation. For example, when it is determined in operation 308 that the user has selected another program by using the EPG, the smart television 1000 may play the selected program in operation 309.

When the smart television 1000 performs the response operation, if the response operation is a process performed in the application, the smart television 1000 may display a result of the response operation on a display location of the application. If the response operation is a process performed in another application, the smart television 1000 may display a result of the response operation in a display location of the other application. The application determined by the smart television 1000 may perform a pre-defined operation, by performing the response operation based on the operation type information and the operation location information.

For example, it may be assumed that the smart terminal 2000 displays the EPG, and the smart television 1000 displays the program that is currently played. If the user selects a program in the EPG displayed on the screen of the smart terminal 2000, the response operation with respect to the user's selection may be to play the selected program, and thus, the program selected by the user in the smart terminal 2000 may be played on the screen of the smart television 1000. If the user selects "to open a next page of the EPG" on the screen of the smart terminal 2000, the response with respect to the selection may be to display the next page of the EPG, and thus, the next page of the EPG may be displayed on the screen of the smart terminal 2000.

Figure 4:
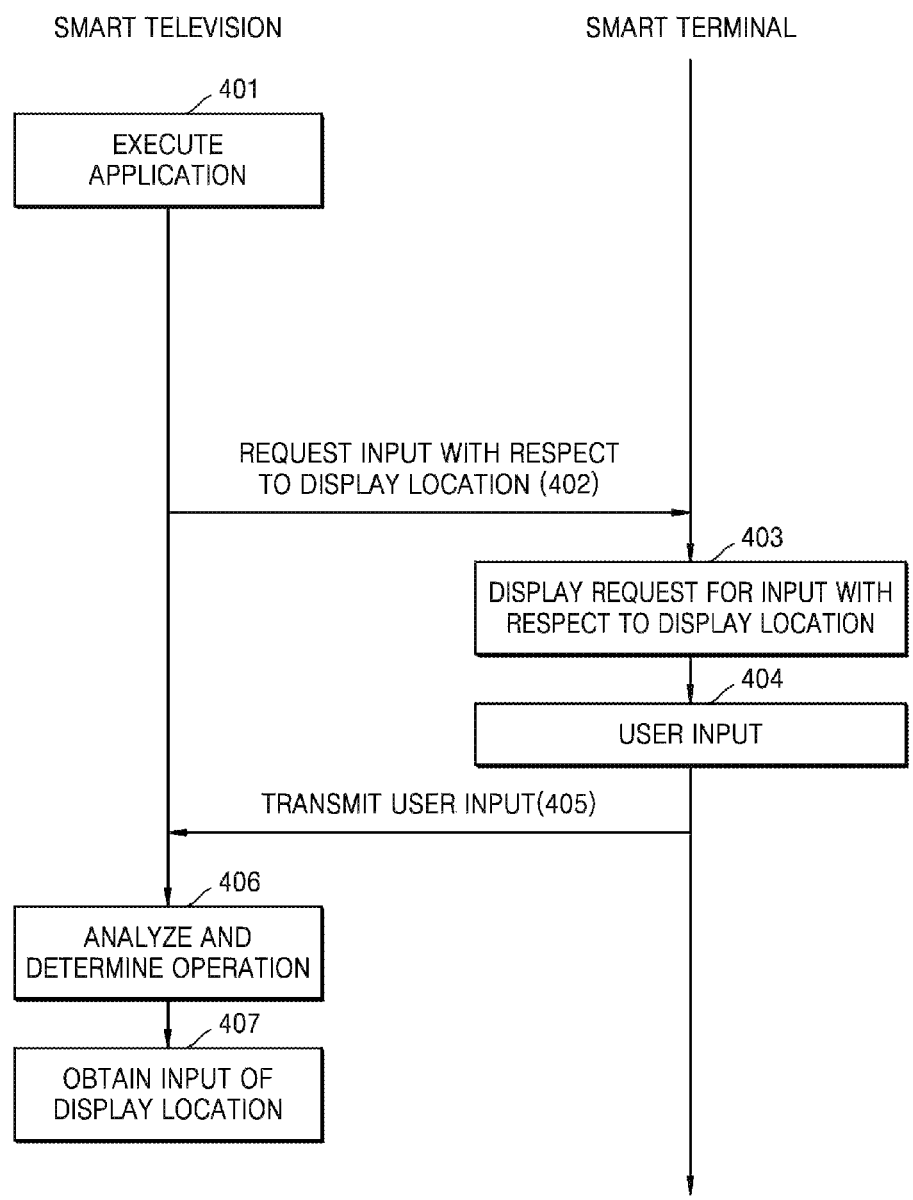
FIG. 4 is a flowchart of a method in which a smart television requests information with respect to a display location from a user, by using a smart terminal, according to an exemplary embodiment.

FIG. 4 is a flowchart of a method in which the smart television 1000 requests information with respect to a display location from a user, by using the smart terminal 2000, according to an exemplary embodiment. FIG. 4 is a flowchart of an example of the method of interaction between the smart television 1000 and the smart terminal 2000 of FIG. 3. The flowchart of FIG. 4 is a portion of the interaction method of FIG. 3. Thus, even if descriptions are omitted, the interaction method of FIG. 3 applies to the interaction method of FIG. 4.

In operation 401, the smart television 1000 receives an application execution command, and executes an application based on the application execution command. In operation 402, the smart television 1000 requests the user for input with respect the display location.

For example, the smart television 1000 may transmit an application window requesting a user to input a display location, to the smart terminal 2000. The smart television 1000 may composite application windows including a list of all possible display locations. The display locations on the list may include the smart television 1000 and all smart terminals 2000 connected to the smart television 1000. Methods of compositing the application windows are the same as pervious methods, and thus, their detailed description will be omitted. Also, before transmitting a result of the composition to the smart terminal 2000, the smart television 1000 may encode and compress the composition result. If the smart terminal 2000 and the smart television 1000 have different resolutions, the smart television 1000 may adjust an interface of the application according to the resolution of the smart terminal 2000, before compositing the content of each window. This is to make the display of the application interface in the smart terminal 2000 better.

The smart television 1000 may transmit the composition result to the smart terminal 2000. The communication between the smart television 1000 and the smart terminal 2000 may be performed by using WiFi, Bluetooth, etc., but it is not limited thereto. When the smart television 1000 transmits data, a transmission rate thereof may be set according to an actual condition. In a WiFi connection, the smart television 1000 may transmit the composition result at 30 frames per second, but it is not limited thereto.

In operation 403, the smart terminal 2000 displays the request of the user for input with respect to the display location. For example, the smart terminal 2000 may display the composition result received from the smart television 1000. If the composition result received from the smart television 1000 is encoded or compressed by the smart television 1000, the smart terminal 2000 may first decode or decompress the received content, and then, may display the content of the windows on the screen. In preparation for the case where the resolutions of the smart terminal 2000 and the smart television 1000 are different from each other, the smart terminal 2000 may receive resolution information of the smart television 1000 after receiving the composition result of the application windows, and may perform resolution adjustment with respect to the received composition result, thereby obtaining an optimal display result.

In operation 404, the smart terminal 2000 receives a user input. For example, the user may perform an operation of inputting the display location by using the user input interface 2500 of the smart terminal 2000. In operation 405, the smart terminal 2000 transmits the user input to the smart television 1000. For example, the smart terminal 2000 may transmit the user's touch operation and the touch location to the smart television 1000, without analyzing the touch operation and obtaining the information that "the user selects a display location." If the resolution adjustment is performed in operation 403, the operation location information may have to be converted into the operation location information corresponding to the resolution before the resolution is adjusted. The operation location information may be coordinate information. In this case, the coordinate of the operation location information may have to be converted in correspondence to the resolution of the composition result transmitted by the smart television 1000.

In operation 406, the smart television 1000 analyzes the received user input, and determines an operation. For example, the smart television 1000 may determine the display location selected by the user, by analyzing the received operation information and the composition result transmitted to the smart terminal 2000.

In operation 407, the smart television 1000 obtains the input information of the display location, as a result of operation 406. The smart television 1000 may record the display location of the application in the memory 1200 of the smart television 100. When the application is executed again the next time, the smart television 1000 may instantly determine the display location of the application by using the data stored in the memory 1200. In this case, the display location of the application is the same as the display location selected by the user when the application was executed before. According to this method, the user may not have to newly select the display location of the application every time.

Figure 5:
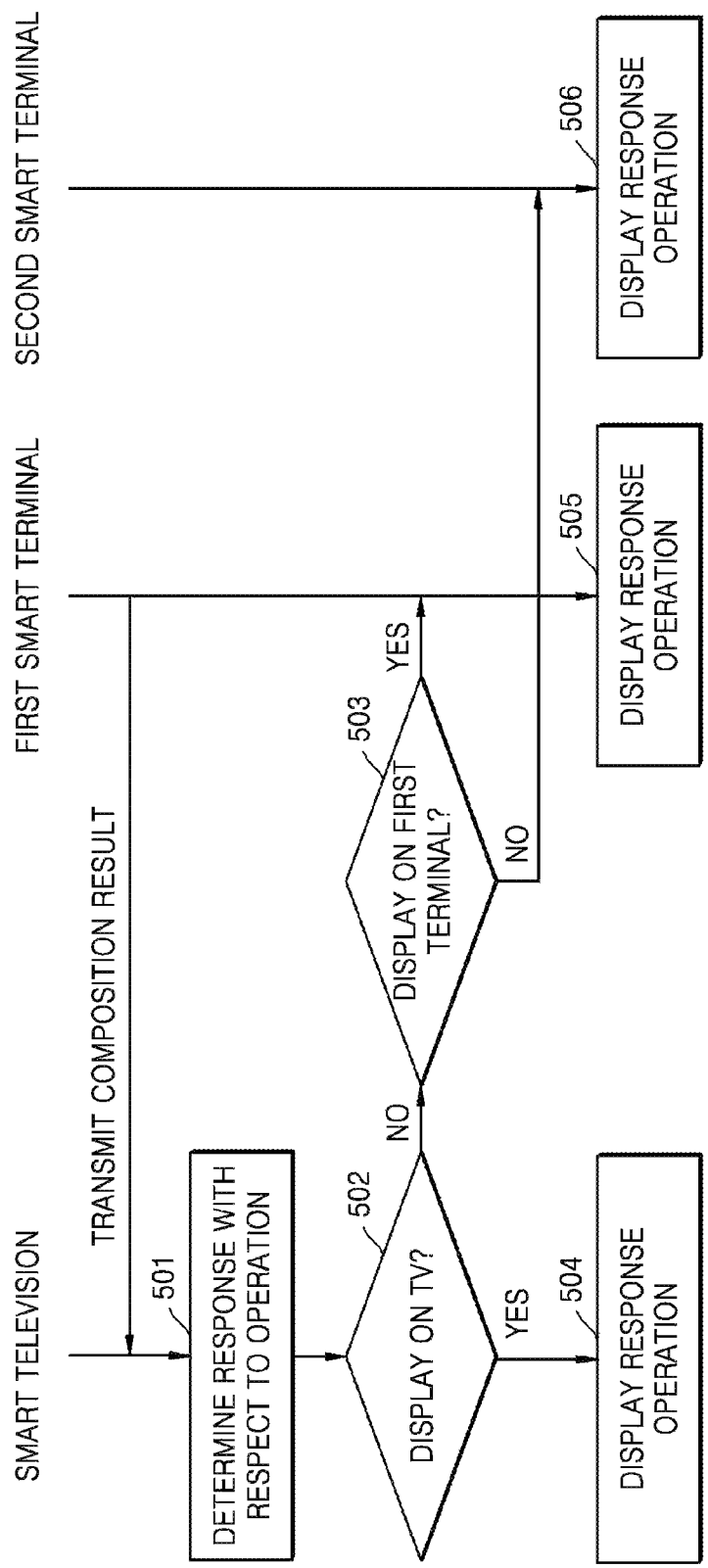
FIG. 5 is a flowchart of a method in which a smart television determines a response operation with respect to operation information that is received from a smart terminal, and executes the determined response operation, according to an exemplary embodiment.

FIG. 5 is a flowchart of a method in which the smart television 1000 determines a response with respect to the operation information received from the smart terminal 2000 and executes the determined response operation, according to an exemplary embodiment. The smart television 1000 receives the composition result from a first smart terminal. Smart terminals illustrated in FIG. 5 may be the smart terminal 2000 described above.

FIG. 5 is the flowchart of an example of the interaction method between the smart television 1000 and the smart terminal 2000 of FIG. 3. FIG. 5 is the flowchart of a portion of the interaction method of FIG. 3. Thus, even if descriptions are omitted, the interaction method of FIG. 3 applies to the interaction method of FIG. 5.

In operation 501, the smart television 1000 determines the response with respect to the user operation. For example, when the user selects a program in an EPG, the smart television 1000 may determine the response of playing the selected program.

In operations 502 and 503, the smart television 1000 determines whether to display the program on the smart television 1000 and whether to display the program on the first terminal, respectively. That is, the smart television 1000 may obtain the information of the display location of the program. The smart television 1000 may request the information of the display location by using the smart television 1000 or a screen of the first smart terminal, or may use the display location stored in the memory. The smart television 1000 may display the program on a third device, that is, a second smart terminal, according to a user's selection. If the user selects to display the program on other devices than the smart television 1000 and the first smart terminal in operation 502 and 503, the smart television 1000 may search for new terminals according to the user's selection or may display the program on a terminal selected by the user from the terminals that are already connected.

In operations 504 through 506, the smart television 1000, the first terminal, or the second terminal may display the response operation with respect to the user's operation. The display location may be the smart television 1000 or another smart terminal 2000, and the number of smart terminals on which the display may be performed is not limited. Thus, according to an exemplary embodiment, a plurality of applications of the smart television 1000 may be simultaneously performed and displayed, and user's operations may be simultaneously input and controlled in the plurality of applications.

Figure 6:
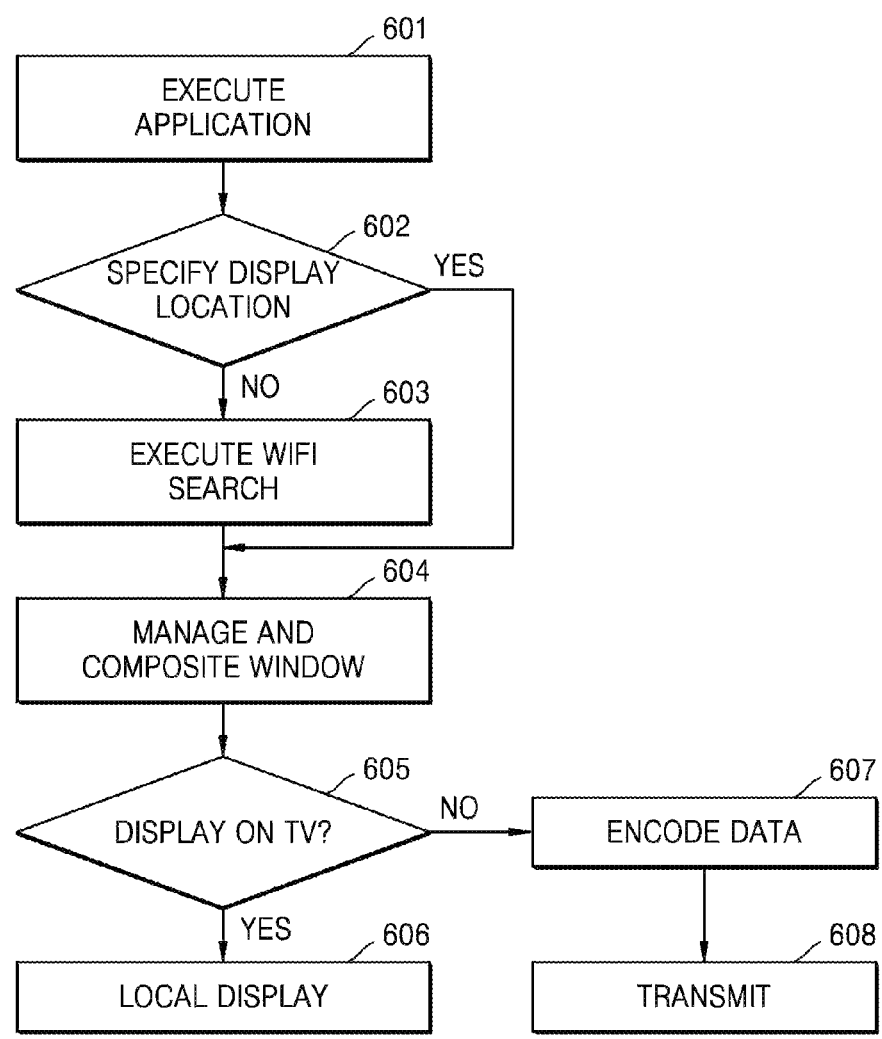
FIG. 6 is a flowchart of a multi-screen control method of a smart television, according to an exemplary embodiment.

FIG. 6 is a flowchart of a multi-screen control method of the smart television 1000, according to an exemplary embodiment. FIG. 6 is the flowchart of an example of the smart television 1000, in the interaction method between the smart television 1000 and the smart terminal 2000 of FIG. 3. Thus, even if descriptions are omitted, the method illustrated in FIG. 3 may also apply to the method illustrated in FIG. 6.

In operation 601, the smart television 1000 executes an application according to a user command of application execution.

In operation 602, the smart television 1000 determines whether a display location of the application is specified. The display location of the application may be stored in the memory 1200 of the smart television 1000. In this case, an additional command of the display location of the application may not be received. When the display location of the application is specified, the smart television 1000 proceeds to operation 604, and when the display location of the application is not specified, the smart television 1000 proceeds to operation 603.

In operation 603, the smart television 1000 executes a WiFi search for searching for the smart terminal 2000. The smart television 1000 may search the connectable smart terminal 2000, and may obtain the command of display location from the user. The display location may be the smart television 1000 and all smart terminals 2000 connected to the smart television 1000, but it is not limited thereto. Methods of searching for the smart terminals 2000 are not limited to WiFi, and other possible methods including Bluetooth, etc. may also be used.

The user may perform an operation in the application displayed on the screen of the smart television 1000, by using a remote controller of the smart television 1000. The smart television 1000 may receive the user operation information and may respond to the operation. The smart television 1000 may determine the application operated by the user, read the user operation, and give a command to the application to respond to the user operation of the user. At the same time, the user may perform an operation in an application displayed on the smart terminal 2000. The two operations and responses may occur simultaneously, and thus, operations and controls with respect to the different applications may occur at the same time.

Thus, the user may select the display location of the applications by using a list of possible display locations displayed on the smart television 1000 or the smart terminal 2000, and the smart television 1000 may obtain the user's selection and specify the display location.

In operation 604, the smart television 1000 manages and composites application windows for displaying the application windows on predetermined locations. If the display location is the smart terminal 2000, and resolutions of the smart terminal 2000 and the smart television 1000 are different from each other, the smart television 1000 may adjust an interface of the application according to the resolution of the smart terminal 2000 before compositing the content of each window.

In operation 605, the smart television 1000 determines whether the display location is on the smart television 1000. When the display location is on the smart television, the smart television 1000 proceeds to operation 606, and when the display location is on the smart terminal 2000, the smart television 1000 proceeds to operation 607.

In operation 606, the smart television 1000 locally displays the application window by using the display 1300 of the smart television 1000. When there is another application which is displayed on the smart television 1000, the screen may be divided or overlapped for the display. Then, the user may control the application displayed on the smart television 1000 by using a remote controller.

In operation 607, the smart television 1000 encodes and compresses data, i.e., the composition result, before transmitting the composition result to the smart terminal 2000.

In operation 608, the smart television 1000 transmits the encoded and compressed composition result. The communication between the smart television 1000 and the smart terminal 2000 may be performed by using WiFi, Bluetooth, etc., but it is not limited thereto. Next, the user may control the application displayed on the smart terminal 2000 by using the user input interface 2500 of the smart terminal 2000.

Figure 7:
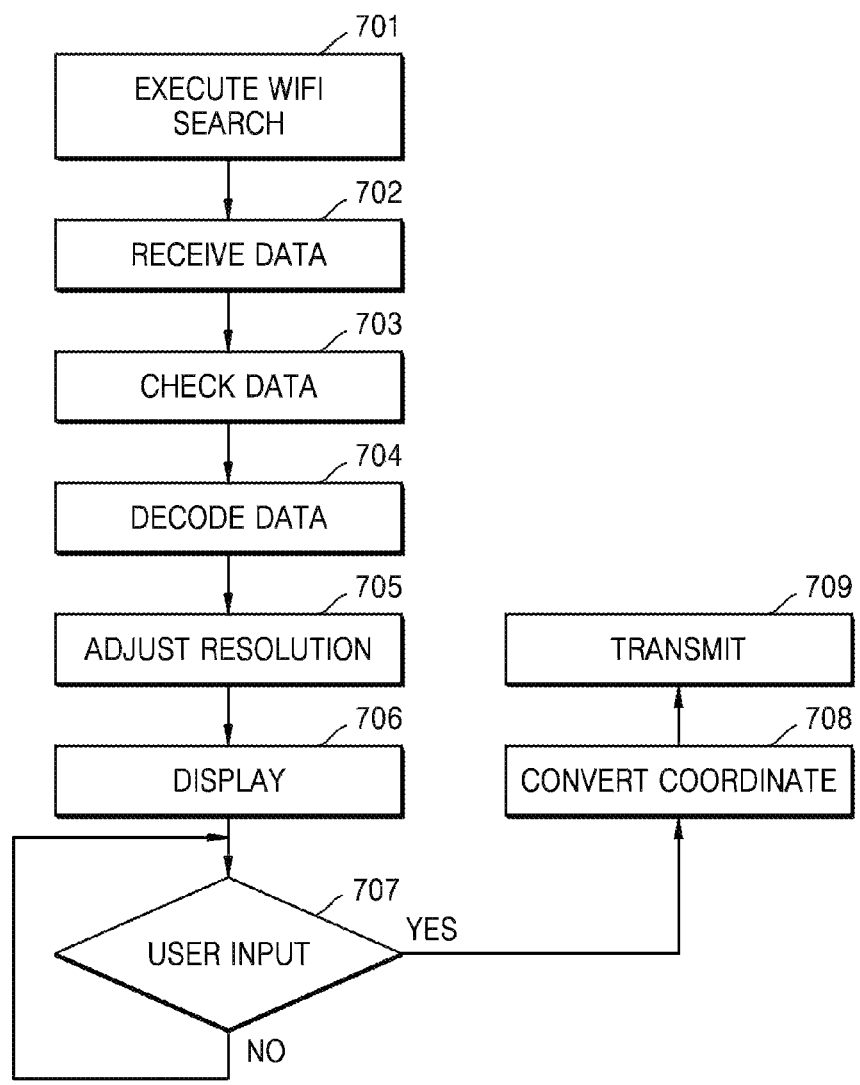
FIG. 7 is a flowchart of a multi-screen control method of a smart terminal, according to another exemplary embodiment.

FIG. 7 is a flowchart of a multi-screen control method of the smart terminal 2000, according to another exemplary embodiment. FIG. 7 is the flowchart of an example of the smart terminal 2000, in the interaction method between the smart television 1000 and the smart terminal 2000 of FIG. 3. Thus, even if descriptions are omitted, the method of FIG. 3 may also apply the method of FIG. 7.

In operation 701, the smart terminal 2000 executes a WiFi search. The smart terminal 2000 is connected to the smart television 1000 according to the search result. The searching method is not limited to WiFi, and other possible methods including Bluetooth, etc. may also be used.

In operation 702, the smart terminal 2000 receives data from the smart television 1000 to which the smart terminal 2000 is connected. In operation 703, the smart terminal 2000 checks the received data. The smart terminal 2000 may check whether the received data is normal data or encoded or compressed data.

In operation 704, the smart terminal 2000 decodes the data received from the smart television 1000. Also, when the data is compressed, the smart terminal 2000 may decompress the data. As a result of operation 704, the smart terminal 2000 may obtain a composition result of the application to be displayed.

In operation 705, in preparation for the case where the resolutions of the smart terminal 2000 and the smart television 1000 are different from each other, the smart terminal 2000 receives resolution information of the smart television 1000 after receiving the composition result of the application windows, and adjusts the resolution with respect to the received composition result.

In operation 706, the smart terminal 2000 displays the received application window by using the display 2300 of the smart terminal 2000. When there is another application displayed on the smart terminal 200, the screen may be divided or overlapped for the display.

In operation 707, the smart terminal 2000 determines whether a user input is received by using the user input interface 2500. The user input interface 2500 may include a touch screen, a keyboard, a mouse, or a button, but it is not limited thereto. When the user does not perform any operation, the smart terminal 2000 lingers in operation 707. When the user performs an input operation, the smart terminal 2000 proceeds to operation 708.

In operation 708, the smart terminal 2000 converts a coordinate of the received user input. For example, the smart terminal 2000 may have to adjust the user operation information received in operation 707. For example, when the resolution adjustment is performed in operation 705, the operation location information may have to be converted into the operation location information corresponding to the resolution prior to the resolution adjustment. The operation location information may be coordinate information. In this case, the coordinate may have to be converted into a coordinate corresponding to the resolution of the composition result transmitted by the smart television 1000.

In operation 709, the smart terminal 200 transmits the user operation information obtained in operation 707 and converted in operation 708 to the smart television 1000. The communication between the smart television 1000 and the smart terminal 2000 may be performed by using WiFi, Bluetooth, etc., but it is not limited thereto.

FIG. 8 is a view of the user input interface 2500 of the smart terminal 2000 receiving a user operation input, according to an exemplary embodiment. The user input interface 2500 of the smart terminal 2000 may include a touch screen, a keyboard, a mouse, or a button, but it is not limited thereto. Referring to portion (a) of FIG. 8, the user input via the user input interface 2500 may include a touch, a zoom-in, a zoom-out, or a swipe operation using a touch screen, but it is not limited thereto. Referring to portion (b) of FIG. 8, the user input via the user input interface 2500 may include a click, a double click, or a drag and drop operation, but it is not limited thereto.

Figure 9:
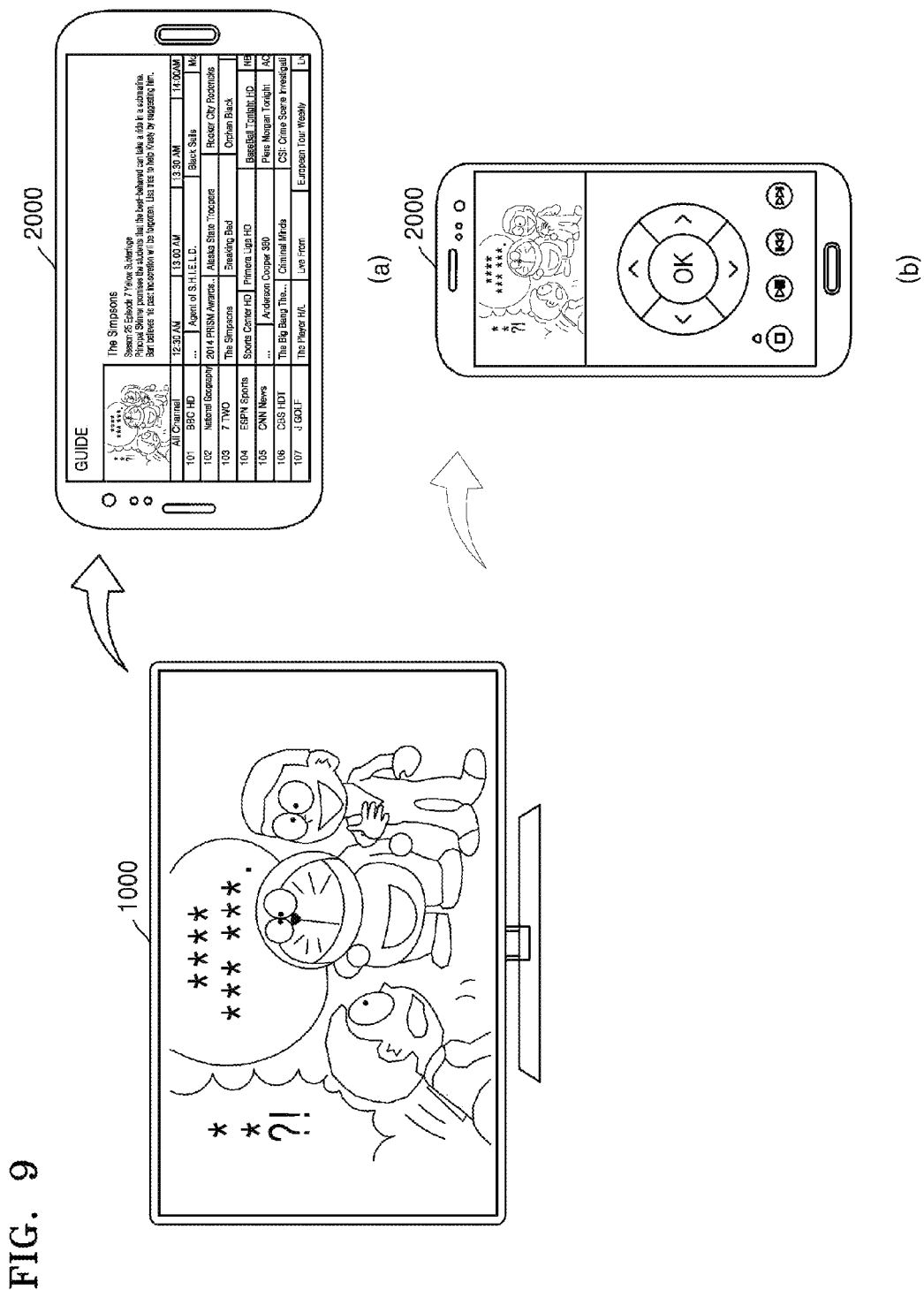
FIG. 9 is a view of a smart television displaying an electronic program guide (EPG) or a remote controller screen on a smart terminal, according to an exemplary embodiment.

FIG. 9 is a view of the smart television 1000 displaying an EPG or a remote controller screen on the smart terminal 2000, according to an exemplary embodiment. Referring to FIG. 9, the smart television 1000 may display an application by using a screen of the smart terminal 2000. For example, referring to portion (a) of FIG. 9, the smart television 1000 may display the EPG on the smart terminal 2000. The user may select a program by using the touch screen of the smart terminal 2000, or may perform an input operation for displaying a next page of the EPG. Referring to portion (b) of FIG. 9, the smart television 1000 may display the remote controller screen on the smart terminal 2000. The remote controller screen may include a volume control button and a channel adjust button. The user may control the volume by using the touch screen of the smart terminal 2000 or may perform an input operation for adjusting the channel. The smart terminal 2000 may transmit the information relating to the user operation to the smart television 1000. The smart television 1000 may analyze the received information and perform a predetermined response corresponding to the user operation.

Figure 10:
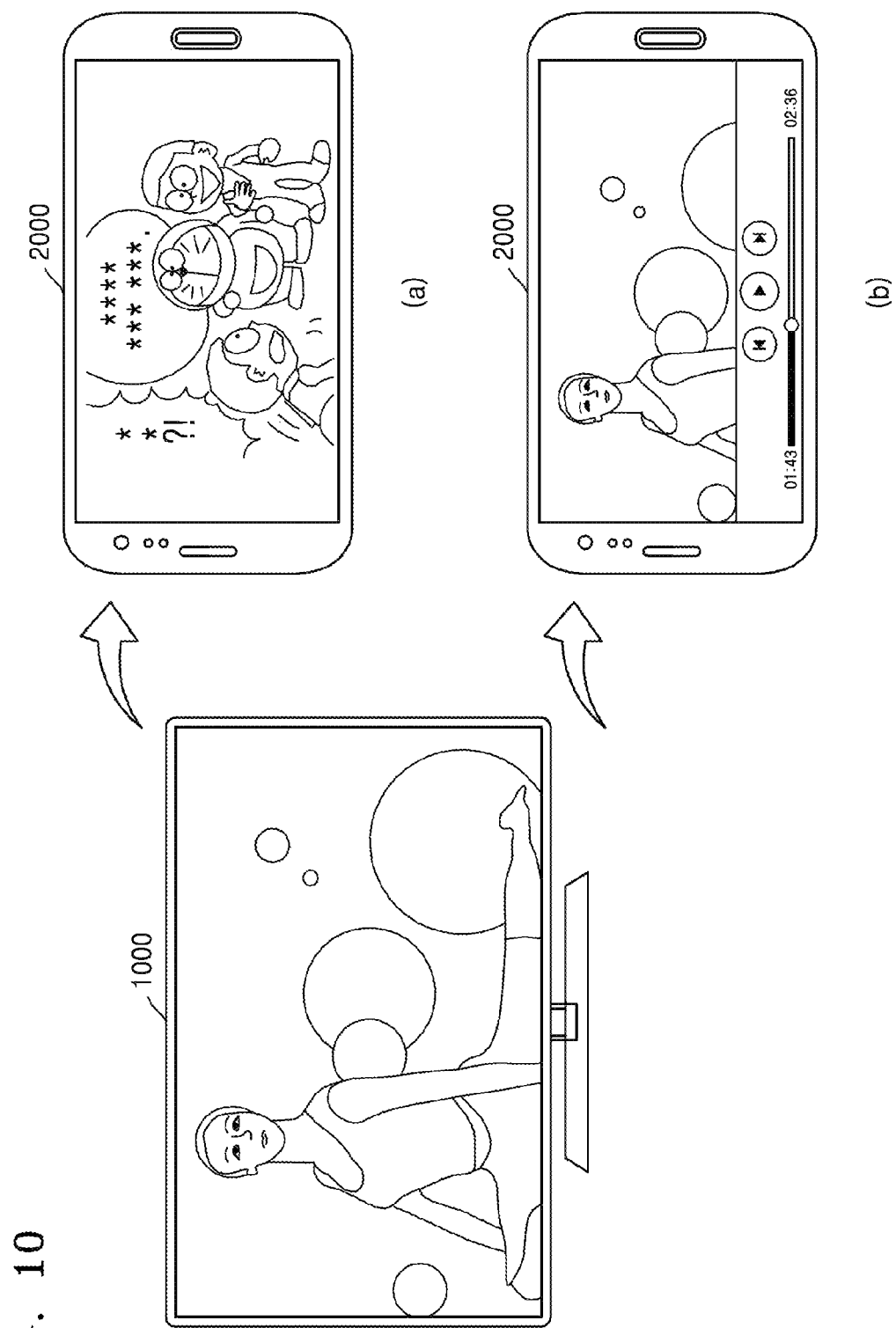
FIG. 10 is a view of a smart television displaying an image or a play control screen on a smart terminal, according to an exemplary embodiment.

FIG. 10 is a view of the smart television 1000 displaying an image or a play control screen on the smart terminal 2000, according to an exemplary embodiment. Referring to FIG. 10, the smart television 1000 may display an application by using the screen of the smart terminal 2000. For example, referring to portion (a) of FIG. 10, the smart television 1000 may display an image on the smart terminal 2000. The image may be the same as an image currently displayed on the smart television 1000, or may be another image selected by the user. That is, the smart television 1000 may play a plurality of images at the same time by using at least one smart terminal 2000. Referring to portion (b) of FIG. 10, the smart television 1000 may display the currently played image and a play control screen on the smart terminal 2000. The play control screen may include play, pause, backward, and forward buttons. The user may perform an operation of controlling the program played on the smart television 1000, by using the touch screen of the smart terminal 2000. The smart terminal 2000 may transmit the information relating to the operation performed by the user to the smart television 1000. The smart television 1000 may analyze the received information and perform a predefined response corresponding to the user operation.

Figure 11:
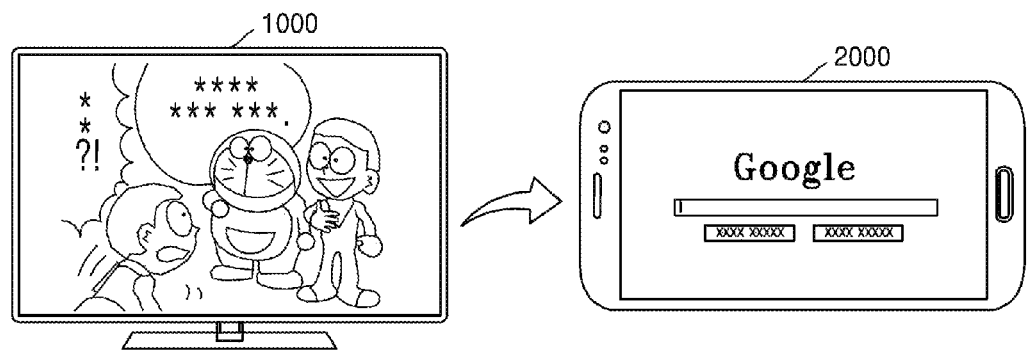
FIG. 11 is a view of a smart television displaying an internet browser on a smart terminal, according to an exemplary embodiment.

FIG. 11 is a view of the smart television 1000 displaying an internet browser on the smart terminal 2000, according to an exemplary embodiment. Referring to FIG. 11, the smart television 1000 may display an application by using a screen of the smart terminal 2000. For example, the smart television 1000 may display an internet browser on the smart terminal 2000. The user may use the internet browser by using the touch screen of the smart terminal 2000. For example, the user may perform an internet search by using a virtual keyboard displayed on the touch screen of the smart terminal 2000. In this case, the smart terminal 2000 may transmit the information relating to the user operation to the smart television 1000 without analyzing the information relating to the user operation, and the smart television 1000 may analyze the received information and perform a predetermined response corresponding to the user operation. That is, the subject controlling the internet browser application is the smart television 1000.

Figure 12A:
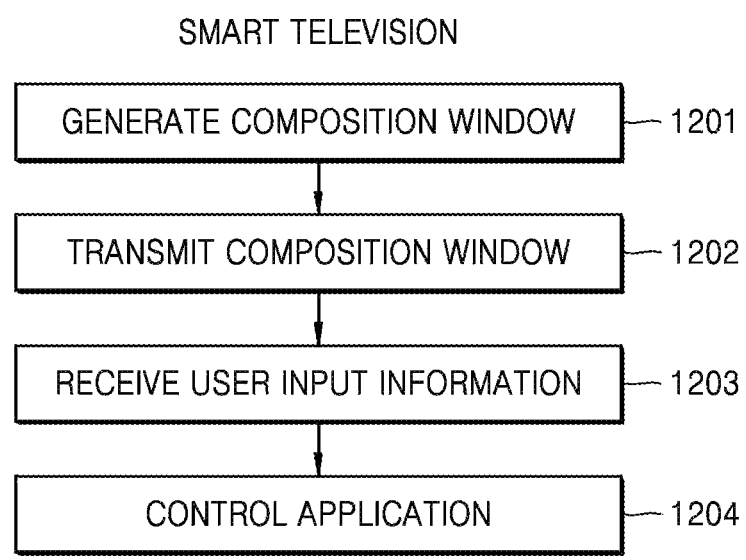
FIG. 12A is a flowchart of a method of controlling an application via a smart television, according to an exemplary embodiment.

FIG. 12A is a flowchart of a method of controlling an application via the smart television 1000, according to an exemplary embodiment. In operation 1201, the smart television 1000 generates a composition window by compositing application windows that are to be displayed. The smart television 1000 may generate the composition window by compositing the application windows having the same display location, and may transmit the generated composition window to the virtual display 1500.

In operation 1202, the smart television 1000 transmits to the smart terminal 20000 the composition window, which is the result of the composition of the application windows in operation 1201, by using the communication unit 1400. Here, the composition window may be the composition window that has been stored and managed by the virtual display 1500.

In operation 1203, the smart television 1000 receives user input information from the smart terminal 2000, and analyzes the user input information received from the smart terminal 2000 to determine the application that is in use by the user and the user operation.

In operation 1204, the smart television 1000 determines a predetermined response with respect to the user operation determined in operation 1203, and controls the application that is in use by the user, by performing the determined response operation. A result of the controlling of the application may be displayed on the smart television 1000, the smart terminal 2000 that transmitted the user operation information, or a third smart terminal.

Figure 12B:
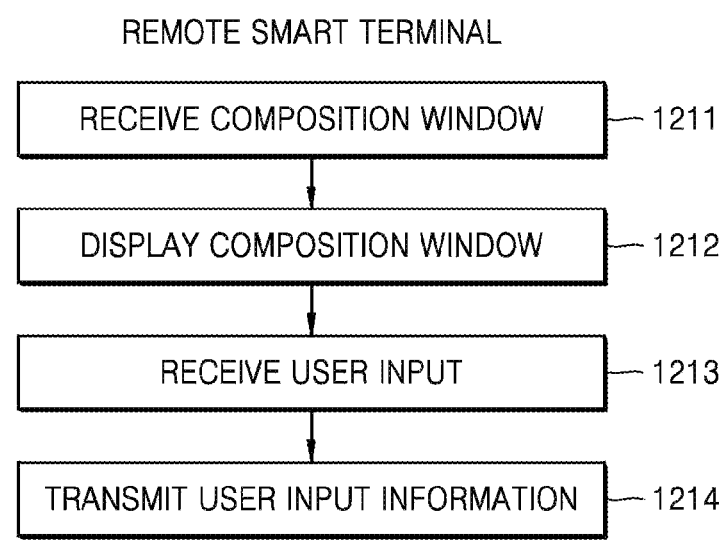
FIG. 12B is a flowchart of a method of controlling an application of a smart television, via a smart terminal, according to an exemplary embodiment.

FIG. 12B is a flowchart of a method of controlling an application of the smart television 1000 via the remote smart terminal 2000, according to an exemplary embodiment. In operation 1211, the smart terminal 2000 receives the composition window that is transmitted by the smart television 1000 in operation 1202.

In operation 1212, the smart terminal 2000 displays the composition window received in operation 1211. The smart terminal 2000 may adjust a resolution of the composition window according to display attribute information of the smart terminal 2000. The display attribute information of the smart terminal 2000 may include a resolution of the smart terminal 2000.

In operation 1213, the smart terminal 2000 receives a user input with respect to the smart terminal 2000. The user input may include user operations performed with respect to the smart terminal 2000.

In operation 1214, the smart terminal 2000 transmits the user input information relating the user input received in operation 1213 to the smart television 1000. The smart terminal 2000 may adjust the information relating to the user input based on the resolution adjustment performed in operation 1212. For example, if the resolution of the composition window is adjusted in operation 1212, the composition window composited by the smart television 1000 and the composition window displayed on the smart terminal 2000 may have different resolutions. In operation 1213, the user may perform an operation with respect to the composition window that is displayed on the smart terminal 2000. Thus, the smart terminal 2000 may have to perform a coordinate conversion in which the coordinate is converted into the coordinate corresponding to the resolution of the composition window transmitted by the smart television 1000.

Figure 13A:
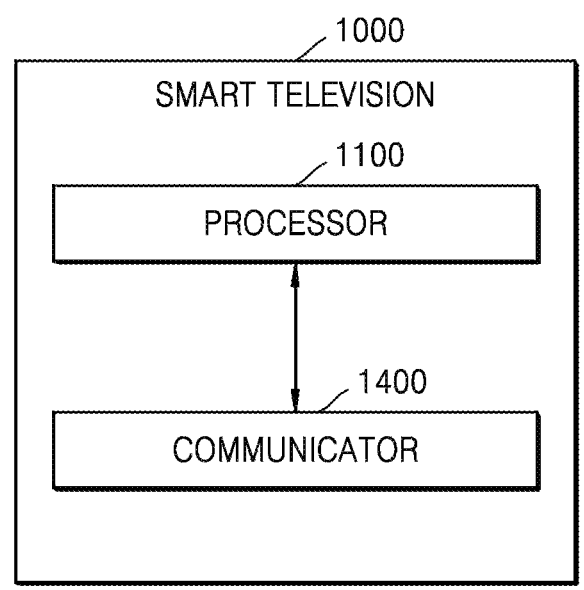
FIG. 13A is a schematic block diagram of a smart television according to an exemplary embodiment.

FIG. 13A is a schematic block diagram of the smart television 1000, according to an exemplary embodiment. In this specification, the aspects described with respect to the smart television 1000 may apply to other smart devices including smart phones. The smart television 1000 includes the processor 1100 and the communicator 1400. The processor 1100 generates a composition window by compositing windows of a plurality of applications. The smart television 1000 may composite windows of applications having the same display location to generate the composition window. The processor 1100 may control the communicator 1400 to transmit the composition window to the smart terminal 2000. Also, the processor 1100 may control and display at least one of the plurality of applications, based on the information relating to the user input received by the communicator 1400.

The communicator 1400 transmits the composition window composited by the processor 1100 to the smart terminal 2000, and receives the information relating to the user input that is input in the smart terminal 2000 in relation to the transmitted composition window.

Figure 13B:
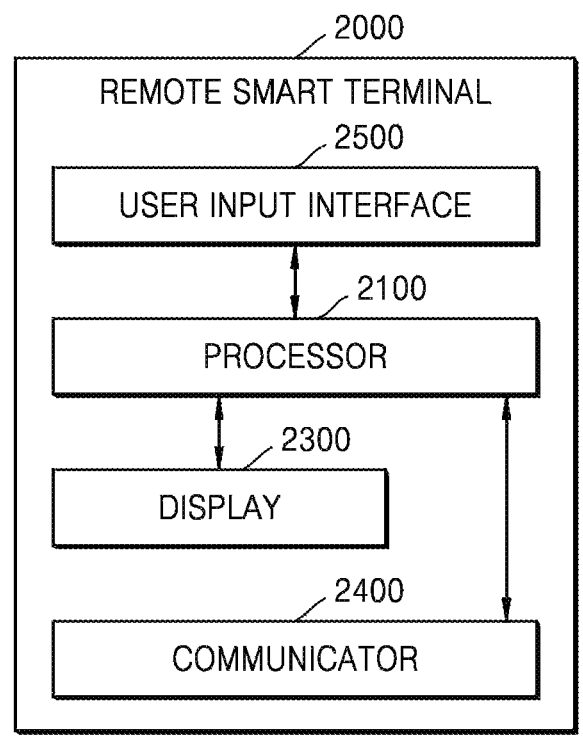
FIG. 13B is a schematic block diagram of a smart terminal according to an exemplary embodiment.

FIG. 13B is a schematic block diagram of the remote smart terminal 2000, according to an exemplary embodiment. The smart terminal 2000 includes the processor 2100, the display 2300, the communicator 2400, and the user input interface 2500.

The communicator 2400 receives the composition window composited by the smart television 1000. The communicator 2400 transmits the information relating to the user input received via the user input interface 2500 to the smart television 1000.

The display 2300 displays the composition window received by the communicator 2400. According to an exemplary embodiment, the smart terminal 2000 may include a touch screen combining the display 2300 and the user input interface 2500.

The user input interface 2500 receives a user input with respect to the smart terminal 2000. The user input may include an operation performed by the user with respect to the smart terminal 2000. According to an exemplary embodiment, the user input may include user operation information including an operation location and an operation type performed by the user with respect to the touch screen. The user operation information may include information relating to a coordinate on the touch screen.

The processor 2100 controls the display 2300, the communicator 2400, and the user input interface 2500. The processor 2100 may adjust a resolution of the composition window based on display attribute information of the smart terminal 2000, and may control the display 2300 to display the adjusted composition window. Also, the processor 2100 may adjust the information relating to the user input based on the resolution adjustment.

A multi-screen control method according to an exemplary embodiment may execute a multi-screen display synchronized at an application window level. The screen of the smart terminal 2000 may be an extension of the screen of the smart television 1000. The user experience of the smart television 1000 may be greatly developed and become affluent by utilizing the relatively small screen and the convenience touch function of the smart terminal 2000. Thus, the user may experience both the pleasure of a large screen of the smart television 1000 and the convenience of the touch function of the smart terminal 2000.

As described above, according to the one or more of the above exemplary embodiments, the multi-screen control method may provide a new window to the user without affecting a played television program. For example, the user may watch content of other applications, such as the EPG, via the new window, and may select another channel to change the program that is currently played on TV to the selected channel. If the new window may be displayed on the screen of the smart phone, rather than occupying a portion of the screen of the smart television or displayed by overlapping the played image, and if the selection and control of the TV programs may be performed by using the touch screen of the smart phone, the screen of the smart television may be used only for playing the program. Also, the smart phone may be in charge of the control operation so that a good interaction experience between the smart phone and the smart television may be achieved.

While not restricted thereto, an exemplary embodiment can be embodied as computer-readable code on a computer-readable recording medium. For example, a control program that controls the above-described operations may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units can include circuitry, a processor, a microprocessor, etc., and may execute a computer program stored in a computer-readable medium.

The foregoing exemplary embodiments and advantages are examples and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A method of controlling an application of a smart television (TV), the method comprising:
   executing, by the smart TV, the application;
   determining, by the smart TV, whether a display location of the executed application is specified;
   searching for, by the smart TV, a smart terminal if the display location of the executed application is not specified;
   generating, by the smart TV, a composition window by compositing windows of applications of the smart TV;
   transmitting, by the smart TV, the composition window to the smart terminal on which the composition window is to be displayed if it is determined that the composition window is not to be displayed on the smart TV;
   receiving, by the smart TV, from the smart terminal, information of a user input which is related to the transmitted composition window; and
   controlling and displaying, by the smart TV, at least one among the applications based on the received information of the user input.

2. The method of claim 1, further comprising receiving, from the smart terminal, attribute information of a display of the smart terminal,
   wherein the generating comprises adjusting an interface in which the composition window is to be displayed, based on the received attribute information.

3. The method of claim 1, further comprising selecting the smart terminal from smart terminals.

4. The method of claim 3, wherein the selecting comprises selecting the smart terminal based on at least one among information of a user selection input selecting the smart terminal, use history information of the smart terminal previously used for displaying the composition window, and information for displaying the composition window.

5. The method of claim 1, wherein the controlling comprises determining the at least one among the applications based on attribute information of a display of the smart TV and attribute information of the smart terminal.

6. A non-transitory computer-readable storage medium storing a program comprising instructions for causing a computer to perform the method of claim 1.

7. A method of controlling an application of a smart television (TV), the method comprising:
   executing, by the smart TV, the application;
   determining, by the smart TV, whether a display location of the executed application is specified;
   searching for, by the smart TV, a smart terminal if the display location of the executed application is not specified;
   receiving, by the smart terminal, from the smart TV, a composition window in which windows of applications of the smart TV are composited if it is determined that the composition window is not to be displayed on the smart TV;
   displaying, by a display of the smart terminal, the received composition window;
   receiving, by the smart terminal, a user input with respect to the displayed composition window; and
   transmitting, by the smart terminal, information of the user input to the smart TV.

8. The method of claim 7, further comprising adjusting a resolution of the composition window based on attribute information of the display,
   wherein the displaying comprises displaying the adjusted composition window.

9. The method of claim 8, further comprising adjusting the information of the user input, based on the adjusted resolution.

10. A non-transitory computer-readable storage medium storing a program comprising instructions for causing a computer to perform the method of claim 7.

11. A smart television (TV) configured to control an application of the smart TV, the smart TV comprising:
   a processor configured to generate a composition window by compositing windows of applications of the smart device TV; and
   a communicator configured to:
   transmit the composition window to a smart terminal on which the composition window is to be displayed if the processor determines that the composition window is not to be displayed on the smart TV; and
   receive, from the smart terminal, information of a user input which is related to the transmitted composition window,
   wherein the processor is further configured to control and display at least one among the applications based on the received information of the user input, and
   wherein the processor is further configured to execute the application, determine whether a display location of the executed application is specified and search for the smart terminal in response to determining that the display location of the executed application is not specified.

12. The smart TV of claim 11, wherein the communicator is further configured to receive attribute information of a display of the smart terminal, and
   the processor is configured to generate the composition window by adjusting an interface in which the composition window is to be displayed, based on the received attribute information.

13. The smart TV of claim 11, wherein the processor is further configured to select the smart terminal from smart terminals.

14. The smart TV of claim 13, wherein the processor is configured to select the smart terminal based on at least one among information of a user selection input selecting the smart terminal, use history information of the smart terminal previously used for displaying the composition window, and information for displaying the composition window.

15. The smart TV of claim 11, wherein the processor is configured to determine the at least one among the applications based on attribute information of a display of the smart TV and attribute information of the smart terminal.

16. A smart terminal configured to control an application of a smart television (TV), the smart terminal comprising:
   a communicator configured to receive, from the smart TV, a composition window in which windows of applications of the smart TV are composited if it is determined, by the smart TV, that the composition window is not to be displayed on the smart TV;
   a display configured to display the received composition window; and
   a user input interface configured to receive a user input with respect to the displayed composition window,
   wherein the communicator is further configured to transmit information of the user input to the smart device TV, and
   wherein the communicator is further configured to receive, from the smart TV, a search signal if it is determined, by the smart TV, that a display location of an application executed in the smart TV is not specified.

17. The smart terminal of claim 16, further comprising a processor configured to adjust a resolution of the composition window based on attribute information of the display,
   wherein the display is configured to display the adjusted composition window.

18. The smart terminal of claim 17, wherein the processor is further configured to adjust the information of the user input, based on the adjusted resolution.

* * * * *